United States Patent [19]

Kintz

[11] 4,187,634
[45] Feb. 12, 1980

[54] ANIMAL TRAP FOR CAPTURING BURROWING ANIMALS

[76] Inventor: Glenn W. Kintz, 3306 Ammon Way, Forest Grove, Oreg. 97116

[21] Appl. No.: 907,288

[22] Filed: May 18, 1978

[51] Int. Cl.² .......................................... A01M 23/20
[52] U.S. Cl. ....................................................... 43/61
[58] Field of Search ................. 43/60, 61, 63, 62, 80, 43/78, 79

[56] References Cited

U.S. PATENT DOCUMENTS

| 123,807 | 2/1872 | Bowman | 43/61 |
|---|---|---|---|
| 1,382,416 | 6/1921 | Dresser | 43/61 |
| 1,844,739 | 2/1932 | Austin | 43/61 |
| 1,996,872 | 4/1935 | Long | 43/61 |
| 2,278,117 | 3/1942 | Perinelli | 43/61 |
| 2,589,002 | 3/1952 | Uonada | 43/61 |
| 2,683,951 | 7/1954 | Hamaker | 43/61 |
| 2,725,661 | 12/1955 | Bowman | 43/61 |
| 2,813,369 | 11/1957 | Tomisee | 43/61 |

Primary Examiner—Nicholas P. Godici
Attorney, Agent, or Firm—Clarence A. O'Brien; Harvey B. Jacobson

[57] ABSTRACT

A trap adapted for use in the live capture of burrowing animals in a subterranean environment, the invention comprises an elongated body open at one end to allow entry of the animal, the body being formed of a continuous upper roof portion and a grill-like lower floor portion. The grill-like structure of the floor portion is adapted to be embedded in the earthen floor of the tunnel of an animal which is to be trapped, thereby providing an inducement to a tunnelling animal to enter the enclosing body of the trap due to the provision of a natural earthen floor within the trap. A spring-actuated gate is caused to close the open end of the trap body on contact by the animal with a padded trigger plate located at the opposite end of the trap, displacement of the trigger plate resulting in dislodgement of a trigger rod from a "set" position relative to the spring-actuated gate.

9 Claims, 6 Drawing Figures

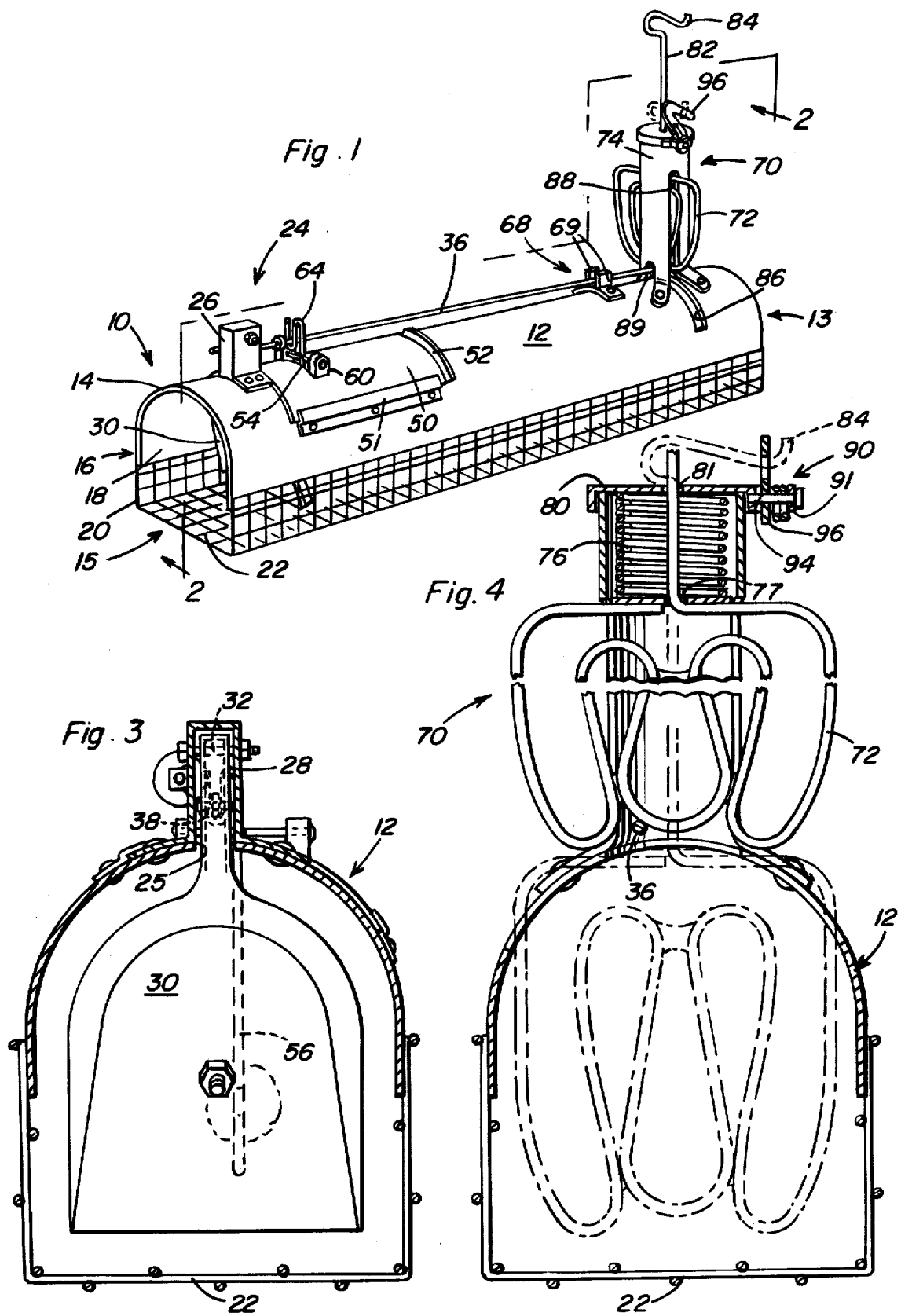

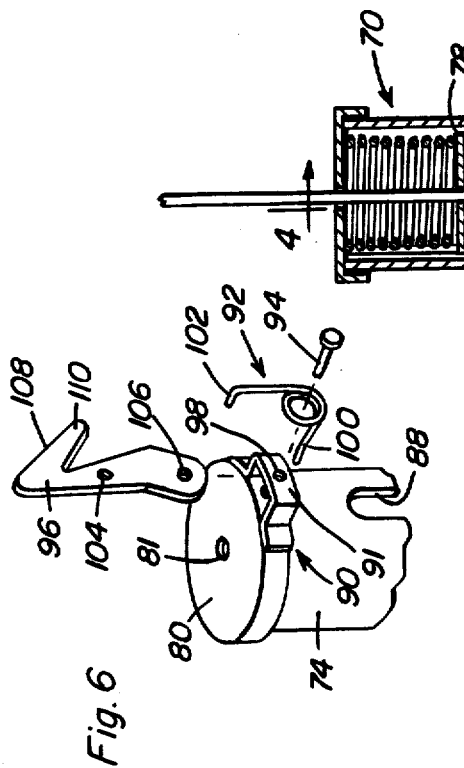
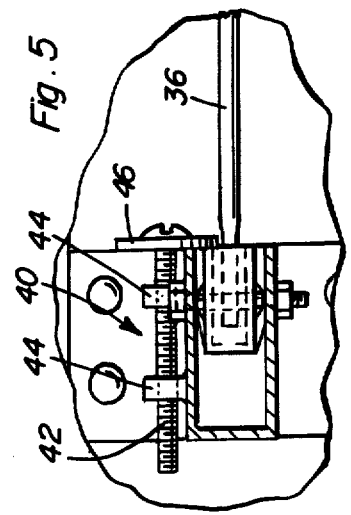
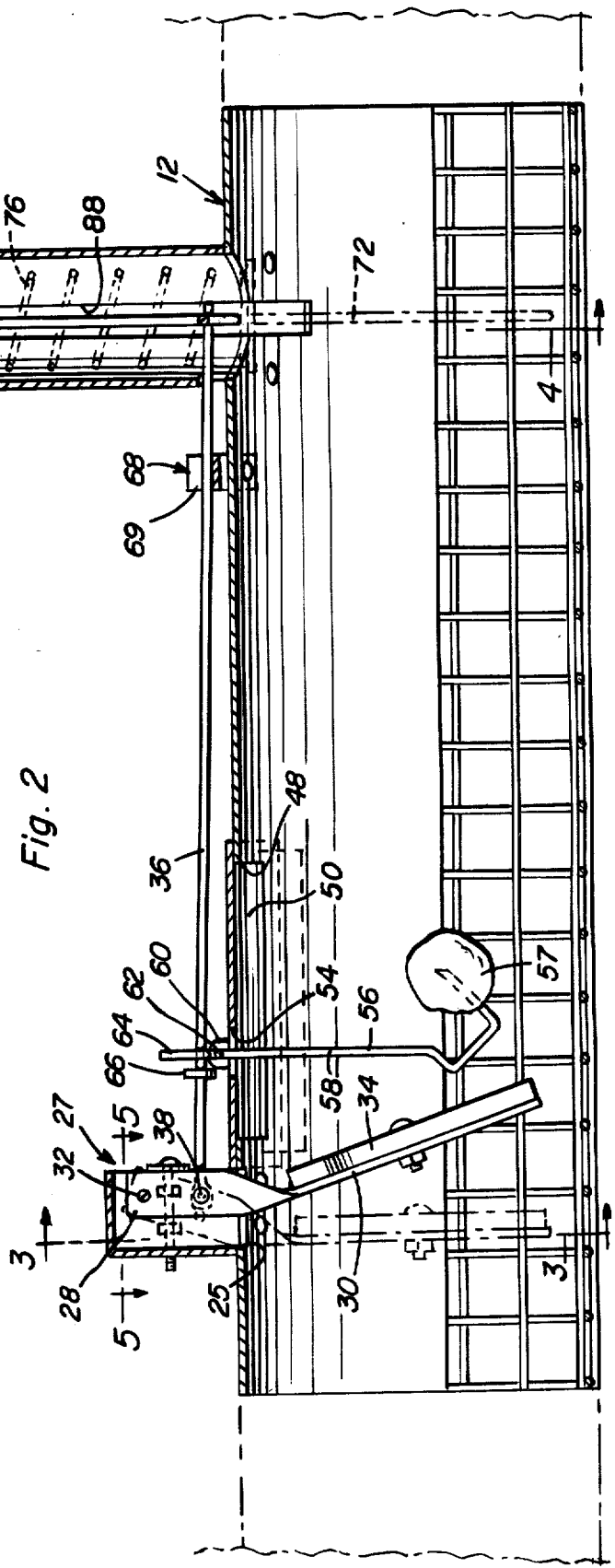

ANIMAL TRAP FOR CAPTURING BURROWING ANIMALS

BACKGROUND OF THE INVENTION

1. Field of the Invention

The invention relates generally to structures for live entrapment of animals and particularly tunnelling animals, the trap utilizing basic instincts and characteristics of the animal to assist in the capture thereof.

2. Description of the Prior Art

Trap structures intended to capture animals in subterranean environments have long been known in the art. In U.S. Pat. No. 904,706, Martinson discloses a trap comprised of an elongated receptacle having gravity-actuated gates formed at each end thereof. The animal which is to be trapped must push open one of the gates in order to enter the trap, the gate closing after entry of the animal due to the force of gravity. However, wary burrowing animals cannot readily be induced to exert the effort sufficient to raise a hanging gate in order to effect entry into a trap. Martinson further does not provide a positive source of energy for closing his gates after an animal has entered into his trap, the gravity-actuated gates of Martinson being readily blocked by loose soil or other debris in a subterranean environment. The solid metal floor of Martinson further does not provide a familiar environment to a burrowing animal, the animal thereby being less inclined to enter the Martinson trap.

In U.S. Pat. No. 1,186,238, Smyrski discloses a pitfall trap which has an indicator mechanism which alerts the trapper at a distance that the trap has been entered.

In U.S. Pat. No. 2,225,251, Andrick discloses an animal trap formed of a metal receptacle of elongated conformation. The elongated receptacle of Andrick has a barrier at each end thereof for containing an animal within the trap on activation of the closure mechanism. The Andrick structure comprises a pivoted floor trap which blocks exit of the animal from the trap on pivoting of a false floor. The Andrick trap must be set in substantially horizontal dispositions due to the reliance of the trap on a gravitational closure mechanism. In a subterranean environment, the Andrick trap would be further subject to fouling of the closure mechanism by loose soil or other debris.

Hamaker, in U.S. Pat. No. 2,683,951, discloses a circular tube for the taking of burrowing animals, such as moles, spring-loaded restraining devices being set to project into the body of the burrowing animal on passage of the animal into the trap. In order for the Hamaker trap to function, the circular tube of the trap must be formed of an axial dimension only slightly greater than the size of the burrowing animal. Burrowing animals show a substantial reluctance to enter close-fitting enclosures which are unfamiliar.

In U.S. Pat. No. 3,925,922, Foltier discloses an elongated receptacle formed of a mesh material which allows at least a portion of the floor of the trap to receive soil into the interior of the trap. However, the Foltier structure is cylindrical in conformation and thus does not provide a substantially flattened floor of a width which acts to lessen the chances of the animals coming in contact with an unfamiliar material, such as the mesh forming the body of the trap. The Foltier structure further includes doors or gates at each end of the trap which must be forced open by the animal in order for the animal to enter the trap.

The present invention provides a trap structure which can be readily placed in a tunnel of a burrowing animal, the excavation required to implace the trap not having to be formed in any particular shape to allow placement of the trap into the tunnel. The present trap further provides an indicator mechanism which alerts the trapper to the fact that the trap has been sprung. Animals entering the present trap further are not required to force open gates enclosing the trap at either end thereof. The present trap also provides for the application by the animal of a relatively small force once within the trap structure which causes positive closure of gate structures at the open end or ends of the trap in order to preclude escape from the trap.

SUMMARY OF THE INVENTION

The present invention provides a trap particularly suited for capturing burrowing animals, the present trap being disposable within tunnels created by said animals with minimum disturbance to the subterranean environment. A burrowing animal moving along a tunnel in which the present trap has been disposed has little indication that a trap is located within the tunnel until the trap has actually been entered and triggered in a manner to prevent escape from the trap. The present trap takes the form of an elongated receptacle having a trigger plate mechanism forming a barrier at the end thereof opposite the end of the trap through which the animal enters, the trigger plate mechanism activating a guillotine barrier at the entry end on contact by the animal with the trigger plate mechanism. The guillotine surmounts the open end of the trap while the trap is in the "set" position, the barrier comprising a gate which is held open against a coil spring by a trigger rod which extends the length of the trap to connect to the trigger plate mechanism, movement of the trigger plate mechanism causing disengagement between the trigger rod and the closable guillotine gate. The trigger plate mechanism is caused to function on movement of an animal into contact therewith, a plate extending into the interior of the trap being padded to prevent arousing the suspicion of an animal which comes in contact therewith. The trigger plate itself further acts to form a barrier at the end of the trap opposite the guillotine gate which is activated on displacement of the trigger plate.

The present trap is further provided with adjustment structure which allows setting of the force which is necessary to displace the trigger plate and thereby activate the guillotine gate for closure of the trap. Therefore, the sensitivity necessary for effective operation of the trap can be varied as desired.

Upper portions of the present trap are formed of continuous sheet metal or the like to form a semi-circular overhead arch which prevents entry of loose soil or other debris into the interior of the trap from above. Floor portions of the present trap are formed of a substantially planar mesh material, portions of the side walls further being formed from similar mesh material. The mesh material forming the floor and portions of the side walls allow loose soil to be received within the interior of the trap at lower portions thereof form a soil floor which apears natural to the burrowing animal as it proceeds into the open end of the trap.

A portion of the guillotine gate structure can be configured to extend upwardly of the trap and above the surface of the earth to provide an indication of whether the trap is in the "set" or in the "sprung" conformation. In this manner, the trapper need not dig into the earth to excavate the trap in order to determine whether an animal has been trapped thereby or whether the trigger mechanism has been activated.

The present trap is, therefore, seen to provide a structure which is particularly intended to capture burrowing, dirt-pushing animals, such as moles. In order to catch such animals, the trap must first be set and then placed in an excavated section of the animal's tunnel in such a manner that the trap appears to be a continuation of the tunnel. Since the present trap is directional, the direction in which the animal will travel must be anticipated and the trap properly oriented. The wire mesh floor section of the trap enclosure is firmly pressed into the dirt floor of the tunnel so that the animal will have the impression that it is progressing upon the natural earth floor of the tunnel. The upper portions of the trap are lightly covered with earth or other debris to exclude light therefrom and prevent temperature variations within the trap. However, a small opening in the roof of the tunnel can be maintained forward of the trap so that the animal will attempt to move along the tunnel and through the trap in order to repair this opening in the tunnel. The animal itself causes activation of the trap on entry into the elongated enclosure due to contact between the animal and a trigger plate disposed within the interior of the trap near the end thereof opposite the entry end of the trap. When the animal pushes its own body or a load of dirt which is being pushed in front of the animal against a trigger plate extending into the trap, a trigger mechanism causes a spring-loaded guillotine gate to be released at the entry end of the trap to close said entry end.

An inspection port disposed in the roof of the trap can be utilized to insert a baited trigger into the interior of the trap. Accordingly, animals which will enter tunnels and which can be attracted to bait can be trapped through use of the present structure.

It is, therefore, an object of the present invention to provide an animal trap which is particularly adapted for use in the live capture of burrowing animals in a subterranean environment, the invention comprising an elongated body open end to allow entry of the animal, the open entry end being closable on contact between the animal and a trigger mechanism disposed interiorly of the trap.

It is another object of the present invention to provide a trap structure which can be disposed within tunnels formed by a burrowing animal, the trap comprising an elongated body member formed of a continuous upper roof portion and a grill-like lower floor portion, the grill-like lower floor portion of the trap being embedded in the earthen floor of the animal's tunnel to provide a floor in the trap which consists of the same material as the floor of the tunnel itself, thereby providing an inducement to the tunnelling animal to enter the enclosing body of the trap.

It is a further object of the present invention to provide a trap for burrowing animals which is adapted to be disposed within a subterranean tunnel environment, a spring-actuated guillotine gate being disposed over the open entry end of the trap when in the set position, the gate being adapted to close on contact by the animal with a padded trigger plate located at the opposite end of the trap, displacement of the trigger plate resulting in dislodgement of a trigger rod from a supporting relationship to the spring-actuated guillotine gate.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view illustrating the trap structure of the present invention;

FIG. 2 is a sectional view taken generally along lines 2—2 of FIG. 1;

FIG. 3 is a sectional view taken generally along lines 3—3 of FIG. 2;

FIG. 4 is a sectional view taken generally along lines 4—4 of FIG. 2;

FIG. 5 is a sectional view taken generally along lines 5—5 of FIG. 2; and

FIG. 6 is a detail perspective assembly view of portions of the spring housing structure of the invention.

DESCRIPTION OF THE PREFERRED EMBODIMENTS

Referring now to the drawings and particularly to FIGS. 1 and 2, the trap of the present invention is seen generally at 10 to comprise an elongated body member 12 comprising an arcuate roof portion 14, side walls 16 and a mesh floor 22. The arcuate roof portion 14 is seen to be formed of substantially continuous sheet material which prevents entry of loose soil or other debris into the interior of the trap. The side walls 16 are seen to be formed at continuous upper portions 18 thereof by a continuation of the arcuate roof portion 14. Lower side wall portions 20 of the side walls 16 are preferably formed of a mesh material essentially identical to the material from which the mesh floor 22 is formed. The elongated body member 12 is seen to be essentially open at both ends thereof. An entry end 13 is adated to be closed by structure to be described hereinafter upon entry into the trap 10 of a tunnelling animal and subsequent triggering by the animal of trigger mechanism 24 disposed at opposite end 15 of the trap 10. The mesh floor 22 and the lower side wall portions 20 which are formed of mesh material act to allow loose soil to penetrate into the lowermost portions of the trap 10, thereby to form a soil floor within said trap. The soil floor thus formed within the trap acts an as inducement to a burrowing animal to enter the trap since said soil floor appears to be a continuation of the floor of the tunnel in which the animal is burrowing.

The trigger mechanism 24 disposed at the end 15 of the trap 10 is seen to comprise a housing 26 disposed exteriorly of said body member 12 and attached suitably to roof portion 14 in surmounting relation to an aperture 25 disposed in said roof portion 14. A trigger plate 30, which can be particularly seen in FIG. 3, is disposed within the interior of the body member 12 in blocking relation to opposite end 15 of said body member. The trigger plate 30 can be displaced toward said opposite end 15, that is, in the direction of travel of an animal entering the trap 10 from the entry end 13, by an animal contacting said trigger plate 30, contact with the trigger plate 30 causing the trigger mechanism 24 to displace a trigger rod 36 and thereby activate a guillotine gate closure mechanism 70 as will be described hereinafter. The trigger plate 30 can be seen to be shaped in the conformation of a "dust pan", that is, the trigger plate 30 is shaped to substantially conform to the cross-sectional conformation of the elongated body member 12, thereby to obstruct the passage of an animal through the opposite end 15 of the body member 12. In other words, the trigger plate 30 functions both as a contact structure for triggering the trap and also acts to form a barrier to prevent exit from the trap through the end 15.

The trigger plate 30 is formed with a trigger tongue 28 extending from upper portions thereof, the trigger tongue 28 extending through the aperture 25 formed in the roof portion 14 and into the interior of the housing 26 wherein the trigger tongue 28 is mounted by pin 32 for pivotal movement thereabout. As can be particularly seen in FIG. 2, the trigger rod 36 is pivotally mounted to the trigger tongue 28 by means of a pin 38, the trigger rod 36 extending from the housing 26 through open end 27 thereof. The trigger tongue 28 is further seen to be mounted by the pin 32, the ends of which are carried by opposed side walls of the housing 26. The trigger plate 30 can be provided with a pad 34 formed of a soft resilient material, the pad 34 being suitably attached to the face of the trigger plate 30 which is contacted by an animal within the trap 10. The pad 34 provides a yieldable surface which does not act as a warning to the animal when the animal contacts the trigger plate 30.

As particularly seen in FIGS. 2, 3, and 5, an adjustment mechanism 40 is disposed on the housing 26 to allow adjustment to the tension required to displace the trigger plate 30. The adjustment mechanism 40 essentially comprises a threaded bolt 42 which is mounted by threaded nuts 44 to one side of the housing 26. A washer 46 is disposed in contact with the head of the bolt 42 and extends into contact with upper portions of the trigger tongue 28. The bolt 42 can be linearly adjusted in a direction parallel to the longitudinal axis of the elongated body member 12, thereby to vary the pressure which the washer 46 exerts on the trigger tongue 28. The sensitivity of the trigger mechanism 24 is thereby varied by displacement of the threaded bolt 42.

When a baiting capability is desired, a port 48 is formed in the roof portion 14 forwardly of the trigger mechanism 24, the port 48 being closed by a movable port cover 50 which is slidable within elongated tabs 51 disposed on either side of the port 48. The port cover 50 further has a raised flange 52 disposed at the forward end thereof to facilitate grasping of said port cover 50 in order to slide the cover 50. The port cover 50 further has a longitudinal slot 54 formed therein, the slot 54 receiving shank portion 58 of bait hook 56 therethrough for mounting between struts 60 by means of a pin 62. The bait hook 56 can be provided with a bait 57 as can particularly be seen in FIG. 2. The bait hook 56 is seen to be pivotally mounted such that an animal grasping the bait 57 and pulling said bait toward itself will cause a U-shaped portion 64 forming the terminus of the shank portion 58 of the bait hook 56 to bias against a washer 66 affixed to the trigger rod 36 in opposed relation to said portion 64, thereby to displace the trigger rod 36 to cause closure of the entry end 13 by activation of the guillotine gate closure mechanism 70. As can particularly be seen in FIG. 1, a portion of the trigger rod 36 fits within the cradle formed by the U-shaped portion 64 immediately forwardly of the washer 66.

The trigger mechanism 24, therefore, can be seen to be activated on contact between the animal being trapped and the trigger plate 30 or, when the trap 10 is provided with the bait hook 56, upon forward displacement of said bait hook 56 to cause the U-shaped portion 64 thereof to bias against the washer 66 affixed to the trigger rod 36, either the trigger plate 30 or the bait hook 56 acting to displace the trigger rod 36 to activate the guillotine gate closure mechanism 70.

The trigger rod 36 extends from pivotal connection with the trigger tongue 28 within the housing 26 as aforesaid toward the entry end 13 of the trap 10, a trigger rod guide 68 being suitably attached to the exterior surface of the arcuate roof portion 14 between the ends 13 and 15 to prevent misalignment of said rod 36. The trigger rod guide 68 substantially comprises spaced side members 69 which receive a portion of the trigger rod 36 therebetween.

The trigger rod 36 extends into operative engagement with the guillotine gate closure mechanism 70 near the entry end 13 of the trap 10. The guillotine gate closure mechanism 70 is seen particularly in FIGS. 2 and 4 to comprise a gate 72 which can be formed of a sturdy convoluted wire body which is sufficiently dimensioned to obstruct passage of an animal out of the end 13 on disposition of said gate 72 across the open end 13. As particularly shown in FIG. 4, the gate 72 is provided with an elongated shank 82 which extends outwardly of said gate 72 within a housing 74 which is attached to roof portion 14 of the trap 10. The housing 74 is seen to surmount uppermost portions of an arcuate axial slot 86 formed in the roof portion 14, the gate 72 being disposed above said slot 86 when in the "set" position. The gate 72 passes through the axial slot 86 when the trap 10 is sprung, the gate 72 extending into a position blocking the entry end 13 of the trap 10 when the guillotine gate closure mechanism 70 is actuated. The housing 74 is further seen to be provided with vertical slots 88 disposed on either side thereof in order to receive side portions of the gate 72 thereinto. The gate 72, as particularly seen in FIGS. 1 and 4 is thus disposed partially within the housing 74 and is held under tension therein in a position to be projected through the axial slot 86 in the roof portion 14 of the trap 10 when the trap is triggered.

The free end of the trigger rod 36 extends into the interior of the housing 74 through an opening 89 formed in the side of the housing 74 facing the trigger mechanism 24. The free end of the trigger rod 36 disposed within the housing 74 abuts and holds the gate 72 in a "set" position as particularly seen in FIGS. 1 and 4. When the gate 72 is in the "set" position, a coil spring 76 is compressed within upper portions of the housing 74 between a pressure plate 78 and cap 80 of the housing 74. The coil spring 76 is thus held under tension and is capable of projecting the gate 72 downwardly to close the trap 10 when the free end of the trigger rod 36 is displaced toward the trigger mechanism 24. The pressure plate 78 has an aperture 77 disposed centrally therein to receive the elongated shank 82 of the gate 72 therethrough, the cap 80 of the housing 74 similarly having an aperture 81 disposed therein for allowing the shank 82 to extend outwardly of the housing 74. The pressure plate 78 is essentially carried at the lower end of the shank 82.

Referring particularly now to FIGS. 1, 4 and 6, structure is seen to be provided on the housing 74 which retains the gate 72 in a closed position after activation of the guillotine gate closure mechanism 70. In particular, a clip 90 is disposed on one side of the cap 80, the clip 90 having a U-shaped portion 91 which extends outwardly from said cap 80. An aperture 98 is formed in the U-shaped portion 91 of the clip 90, said aperture 98 receiving a mounting pin 94 therethrough to retain a spring 92 within the interior of said U-shaped portion 91. The spring 92 comprises a coil spring having ends 100 and 102, the end 100 being held under tension against a side portion of the clip 90 while the other end 102 is received within an aperture 104 formed in a retaining hook 96 which is also received within the U-shaped portion 91 of the clip 90 and held therein for pivotal movement by the pin 94. The pin 94 is received within a second aperture 106 formed in a lowermost end of the hook 96. The retaining hook 96 has a slanted cam surface 108 which surmounts hook portion 110. When the guillotine gate closure mechanism 70 is in the "set" position, the gate 72 is substantially disposed within the housing 74 as particularly seen in FIG. 1. In such a conformation, the elongated shank 82 of the gate 72 extends upwardly from the cap 80 of the housing 74, a hook 84 on the end of the shank 82 being disposed several inches above the housing 74. When the guillotine gate closure mechanism 70 is triggered as aforesaid, the gate 72 and thus the hook 84 on the end of the shank 82 is projected downwardly, the hook 84 striking the cam surface 108 of the retaining hook 96, thereby causing the retaining hook 96 to pivot about the pin 94 under tension from the spring 92 until said hook 84 is received by and engaged with arcuate hook-like surfaces of said retaining hook 96 as seen in phantom in FIG. 1. Accordingly, the retaining hook 96, under tension from the spring 92, retains the gate 72 in position across the entry end 13 of the trap 10, thereby to prevent the trapped animal from pushing the gate 72 upwardly to allow escape. The hook 84 disposed on the upper end of the shank 82 of the gate 72 further acts as an indicator of whether the trap 10 is in a set position or not. As seen in FIG. 1, the trap 10 is seen to be in a set position as long as the hook 84 is disposed at a given distance above the cap 80 of the housing 74 and is not engaged with the retaining hook 96 as aforesaid. When the trap 10 is disposed within a tunnel such that the hook 84 extends above the surface of the earth, an observer can determine whether the trap 10 has been sprung without excavating said trap.

The burrowing animals which are particularly intended to be captured through use of the trap 10 are those animals commonly known as moles and pocket gophers. Moles and pocket gophers have dissimilar eating habits, the pocket gopher being herbivorous and subsisting on roots, tubers, and grasses, while the mole is an insectivor with a voracious appetite for earthworms, grubs and insects. The two animals are similar, however, is that their food supplies are obtained by underground burrowing. While the mole rarely surfaces, the pocket gopher often constructs a mound by pushing dirt away from the open end of a burrow. When the gopher has mounded all of the dirt which is to be removed from the burrow, a plug is then pushed into the entry within the burrow, this plug distinguishing the tunnels of the pocket gopher. The mole, on the other hand, pushes all excess dirt from its burrow to the surfaces by working from the burrow and seldom exposes itself to the surface in so doing. While the eyesight of the mole is extremely poor and inferior to that of the pocket gopher, the mole has a very sensitive snout upon which it depends for detection of food.

Taking the foregoing characteristics of these burrowing animals into account, the trap 10 can be used unbaited, the burrowing activity of the animal being sufficient to cause its capture. In order to accomplish this function, the trap 10 must be placed in an excavated section of a burrow, the burrow being at least partially restored to resemble the original burrow. Restoration of a burrow must be sufficiently complete that light is not allowed to enter the burrow near the entry end 13 of the trap 10. However, it is advantageous to allow light to be admitted through a small opening in the burrow beyond the opposite end 15 of the trap 10 so that the animal will detect a breach of the tunnel at this point and proceed through the trap in order to repair the damage incident thereto. It is instinctive and mandatory to such burrowing animals that any breaches in tunnels be rapidly repaired. Since animals of these species may have hundreds of feet of tunnels in their individual burrowing system, a considerable time may elapse before the animal approaches the area of the trap in order to repair such damage. However, this time lag can be precluded by determining where the animal is working within its burrowing system. Observation of mounds or raised dirt can show the portion of the burrowing system in which the animal is working. On dry days in particular, a mound of moist earth indicates very recent activity by the animal. Mounds constructed after recent rainfalls can be identified from those which were constructed prior to the rainfall. Evidence of dying or wilting vegetable rows may indicate the presence of moles therebeneath.

Having determined the presence of a live mole or gopher in a particular area of a burrowing system, a lateral tunnel off the main burrow is excavated, the trap 10 being placed within the excavation with the entry end 13 facing the main tunnel. In order to trap an animal approaching a trapping location from either direction, it is necessary due to the directional nature of the trap 10 to employ two traps, the entry end 13 of one trap 10 being disposed in one direction while the entry end 13 of the second trap 10 is disposed in the opposite direction. In such a situation, an animal proceeding toward the trapping location in either direction would be directed into the trap in that direction. While the trap 10 may be set such that one end is considerably higher than the other, it is preferable to locate the trap 10 as nearly level as is possible with the gradient of the tunnel within which the trap is set. When the tunnel in which the trap is to be set is located, a shear vertical cut is made in the earth such that it will expose a clear open cross section of the tunnel with the bottom of the excavation flush with the bottom of the tunnel. The bottom of the excavation should be long enough to accept the trap and generally in the same direction and at the same gradient as that of the burrow at the exposed opening. The entry end 13 of the trap 10 is preferably placed at the open end of the burrow, the trap being pushed toward the burrow and downward simultaneously such that the trap 10 completely covers the excavation opening and at the same time the mesh floor 22 of the trap 10 is embedded lightly in the earth beneath the trap. The trap 10 is preferably covered to a depth of one-half inch or more with earth or debris to exclude light and to prevent temperature variations. As aforesaid, a small opening can be left in the roof of the tunnel beyond the opposite end 15 of the trap 10.

The trigger plate 30 can be formed of differing materials which provide certain advantages depending on the particular construction thereof. In particular, the trigger plate 30 can be formed of bent wire in combination with sheet metal, the bent wire forming the barrier at the end of the trap which allows the animal to see through the plate 30. Glass or similar materials rimmed with metal in combination with a sheet metal trigger tongue 28 also provides an essentially "see through" trigger plate 30 and barrier.

The trap 10 is set by grasping of the gate 72 and moving said gate 72 outwardly against the compression of the coil spring 76. When the gate 72 is moved above a location through which the free end of the trigger rod 36 extends, the trigger rod 36 is moved forwardly of the trap 10 into a position beneath said gate, the gate 72 being allowed to move downwardly into engagement with the free end of said trigger rod 36. Displacement of the trigger rod 36 as aforesaid causes the trigger plate 30 to be pivoted to a position angled slightly toward the entry end 13 of the trap 10. In this position, the trigger plate 30 can be displaced rearwardly of the trap 10 to cause the trigger rod 36 to also be displaced, thereby releasing the gate 72 which is projected downwardly by the force of the coil spring 76 to close the entry end 13 of the trap 10 and thus capture an animal located within the confines of said trap 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trap for capturing burrowing animals which is disposable within a tunnel formed by said animals, the trap comprising:

a body member having an open entry end and an end opposite said entry end, and including upper and lower roof and floor portions, respectively;

a trigger mechanism disposed near the opposite end of the body member, the trigger mechanism including a transverse trigger plate disposed within the interior of the body member in the path an animal would follow through the trap, the trigger mechanism further including means for mounting the trigger plate for pivotal movement and a trigger rod carried by the mounting means at one end of said trigger rod;

gate means carried by the body member for closing the entry end of the body member, the trigger rod extending longitudinally of the body member to engage the gate means when the trap is in a set conformation; and, spring means carried by the body member for holding the gate mean under tension in the set conformation, displacement of the trigger rod on pivotal movement of the trigger releasing the gate means to allow the spring means to force said gate means into a position blocking the entry end of the body member, said trigger plate having a pad of soft material disposed on the side thereof opposing said open entry end.

2. A trap for capturing burrowing animals which is disposable within a tunnel formed by said animals, the trap comprising:

a body member having an open entry end and an end opposite said entry end, upper roof portions of the body member being formed of a sheet-like material and lower floor portions of the body member being formed of a mesh material;

a trigger mechanism disposed near the opposite end of the body member, the trigger mechanism including a trigger plate disposed within the interior of the body member in the path an animal would follow through the trap, the trigger mechanism further including means for mounting the trigger plate for pivotal movement and a trigger rod carried by the mounting means at one end of said trigger rod;

gate means carried by the body member for closing the entry end of the body member, the trigger rod extending longitudinally of the body member to engage the gate means when the trap is in a set conformation; and, spring means carried by the body member for holding the gate means under tension in the set conformation, displacement of the trigger rod on pivotal movement of the trigger plate releasing the gate means to allow the spring means to force said gate means into a position blocking the entry end of the body member, the upper roof portion of the body member having an opening formed near the opposing end of the body member, the trigger plate having a tongue extending through said opening, a housing surmounting the opening and receiving the tongue therein, the first-mentioned means mounting the tongue within the housing, the housing having an open side portion which receives the trigger rod thereinto for pivotal connection to said tongue, an adjustment mechanism disposed on the housing, the adjustment mechanism comprising at least one threaded nut mounted to the housing, a threaded bolt received by the nut and being positionable therewithin, and a washer member held on an end of the bolt in contiguous relationship to the tongue, the bolt being adjustable in position to vary the degree of movement of the trigger plate.

3. The trap of claim 2 wherein the roof portion has a port formed therein, the structure further comprising a port cover slidably mounted thereover.

4. The trap of claim 3 wherein the port cover has a slot formed therein, the structure further comprising a bait hook disposed within the interior of the body member and having a shank portion extending exteriorly of the body member through the slot, means for mounting the shank portion of the bait hook for movement, and means disposed on the trigger rod and engageable by the shank portion of the bait hook on movement of the bait hook to displace said trigger rod.

5. A trap for capturing burrowing animals which is disposable within a tunnel formed by said animals, the trap comprising:

a body member having an open entry end and an end opposite said entry end, upper roof portions of the body member being formed of a sheet-like material and lower floor portions of the body member being formed of a mesh material;

a trigger mechanism disposed near the opposite end of the body member, the trigger mechanism including a trigger plate disposed within the interior of the body member in the path an animal would follow through the trap, the trigger mechanism further including means for mounting the trigger plate for pivotal movement and a trigger rod carried by the mounting means at one end of said trigger rod;

gate means carried by the body member for closing the entry end of the body member, the trigger rod extending longitudinally of the body member to engage the gate means when the trap is in a set conformation; and spring means carried by the body member for holding the gate means under tension in the set conformation, displacement of the trigger rod on pivotal movement of the trigger plate releasing the gate means to allow the spring means to force said gate into a position blocking the entry end of the body member, the upper roof portion of the body member having a slot formed therein near the entry end of the body member, the slot receiving the gate means therethrough on activation of the trigger mechanism, a housing surmounting the slot and having vertical longitudinal slots formed on opposite sides thereof to receive portions of the gate means therein when the trap is in the set conformation, the housing further having an opening formed in the side facing the opposite end of the body member for receiving the free end of the trigger rod therewithin to engage the gate means and to hold the gate means and the spring means compressed within the housing between the gate means and the upper portion of the housing while the trap is in the set conformation.

6. The trap of claim 5 wherein the trigger plate has a pad of soft material disposed on the surface thereof intended to contact the animal.

7. The trap of claim 5 wherein side walls of the body member are formed of continuous sheet material at upper portions thereof and are formed of mesh material at lower portions thereof.

8. The trap of claim 5 and further comprising means for locking the gate means in a position blocking the entry end of the body member when the trap is sprung.

9. The trap of claim 8 wherein the locking means comprises a spring member carried on the housing, a hook member biased by the spring member, and means for mounting the spring member and hook member on the housing, the gate means comprising a hook formed at the upper end thereof and extending outwardly and upwardly of the housing, the hook camming the hook member downwardly on release of the gate means from engagement with the free end of the trigger rod and locking therewith to maintain the gate means across the entry end of the body member.

* * * * *